United States Patent [19]
Sawyer et al.

[11] Patent Number: 5,632,328
[45] Date of Patent: May 27, 1997

[54] HEAT EXCHANGER ASSEMBLY

[75] Inventors: Robert S. Sawyer, Farmington Hills; LeRoy E. Schopieray, Canton; James T. Ferretti, Plymouth, all of Mich.

[73] Assignee: Ford Motor Company, Dearborn, Mich.

[21] Appl. No.: 567,645

[22] Filed: Dec. 5, 1995

[51] Int. Cl.⁶ .................................................. F28F 7/00
[52] U.S. Cl. ........................ 165/69; 165/67; 165/76; 165/DIG. 71
[58] Field of Search .................. 165/78, 76, 69, 165/67, 81, DIG. 71; 277/183

[56] References Cited

U.S. PATENT DOCUMENTS

| | | | |
|---|---|---|---|
| 3,225,823 | 12/1965 | Frohlich | 165/69 |
| 3,858,291 | 1/1975 | Perpall | 165/69 |
| 4,313,490 | 2/1982 | Heeren et al. | 165/DIG. 71 X |
| 4,328,859 | 5/1982 | Bouvot | 165/78 |
| 4,914,929 | 4/1990 | Shimazaki et al. | 165/69 X |
| 5,348,079 | 9/1994 | Tanaka | 165/67 |
| 5,372,184 | 12/1994 | Joseph et al. | 165/67 |

FOREIGN PATENT DOCUMENTS 52-30962  9/1977  Japan.

OTHER PUBLICATIONS

"The Foammix ® System", Nordson Corporation, 1992 (brochure).
"Foammelt® 180 Processor", Nordson Corporation, 1994 (brochure).

*Primary Examiner*—John Rivell
*Assistant Examiner*—Christopher Atkinson
*Attorney, Agent, or Firm*—Raymond L. Coppielle

[57] ABSTRACT

A heat exchanger assembly for an automotive vehicle is provided. The assembly includes a generally rectangular heat exchanger core defining four generally orthogonal ends and a housing configured to receive the heat exchanger core therein. The housing has a plurality of walls disposed around the ends of the heat exchanger core. At least two of the walls and at least two of the ends cooperate to define a sealing space therebetween. Each of the at least two walls has an injection port provided therein for receiving a seal precursor material into the sealing space. The assembly also includes a seal formed from the precursor material in the sealing space, the seal substantially filling the space.

16 Claims, 2 Drawing Sheets

HEAT EXCHANGER ASSEMBLY

BACKGROUND OF THE INVENTION

1. Field of the Invention

The present invention relates to a heat exchanger assembly for an automotive vehicle which includes a heat exchanger core, a housing, and a seal formed therebetween.

2. Description of Related Art

Automotive heat exchanger assemblies generally include a heat exchanger core mounted within a housing. One such assembly is an evaporator assembly used in automotive air conditioning systems. In a typical automotive evaporator assembly, a warm air stream entering an inlet face of an evaporator core is cooled and dehumidified before exiting from an outlet face of the core. The cooled air stream is then passed into the passenger compartment of the vehicle. Any warm air that does not pass through the evaporator core, i.e., air that leaks around the core and passes into the passenger compartment untreated, decreases the efficiency of the system. Moreover, warm air that leaks around the core may produce undesirable condensation within the housing.

Various solutions to the problem of air leakage around heat exchanger cores have been proposed. These solutions generally comprise providing a preferred resilient gasket around the heat exchanger core in the space between the core and the housing. Preferred gaskets are subject to misalignment, however, and do not provide optimum sealing around the core, especially around areas of the core having uneven surface geometries, such as the fluid tanks. Moreover, due to variances in the size of the space between the core and housing, preferred gaskets may be undersized or oversized relative to o the space. Typical methods of manufacturing the heat exchanger assembly comprise securing the preferred gasket around the core and subsequently inserting the core into the housing. The housing must compress the gasket in order to provide a sealing effect.

"Form-in-place" processes are known in which a foam gasket is formed on a surface of an article prior to mating the article with another article surface. Forming such a gasket on the surface of a heat exchanger core prior to inserting the core into a housing would not solve many of the problems described above with respect to preformed gaskets, however. For example, the formed gasket could still be oversized or undersized relative to the space to be sealed. Moreover, the formed gasket would not generally conform in shape to the housing, and it would still be necessary for the housing to apply a compressive force on the gasket to provide a sealing effect.

SUMMARY OF THE INVENTION

The present invention provides a heat exchanger assembly for an automotive vehicle which overcomes the disadvantages of the prior art. The assembly includes a generally rectangular heat exchanger core defining four generally orthogonal ends and a housing configured to receive the heat exchanger core therein. The housing has a plurality of walls disposed around the ends of the heat exchanger core. At least two of the walls and at least two of the ends cooperate to define a sealing space therebetween. Each of the at least two walls has an injection port provided therein for receiving a seal precursor material into the sealing space. The assembly also includes a seal formed from the precursor material in the sealing space, the seal substantially filling the space.

The present invention also provides a method for manufacturing a heal, exchanger assembly for an automotive vehicle. The method includes the steps of providing a heat exchanger core and a housing configured to receive the core. The housing has a plurality of walls with injection ports disposed at predetermined locations therein. The method also includes the step of positioning the heat exchanger core within the housing such that a sealing space is created between at least two ends of the heat exchanger core and the housing walls. The method further includes the steps of injecting a seal precursor material through the injection ports into the sealing space and causing the precursor material to solidify to form a seal which substantially fills the sealing space.

According to one aspect of the present invention, the housing walls are provided with a plurality of vent ports, and the step of injecting the seal precursor material is continued until the material is visible through the vent ports.

The present invention enables the space around a heat exchanger core to be sealed simply and reliably. Since the seal formed according to the present invention has surfaces which closely conform to surfaces of both the core and the housing, the possibility of leakage around the core is minimized. Moreover, since the core is positioned within the housing before the seal is applied to the core, variations in the size of the space between the core and the housing can be easily accommodated by adjusting the amount of material injected into the space. The vent ports enable rapid, in-process verification that the proper amount of material has been provided.

These and other features and advantages of the present invention will be more fully described below with reference to the following detailed description and drawings.

DESCRIPTION OF PREFERRED EMBODIMENTS

Figure 1:
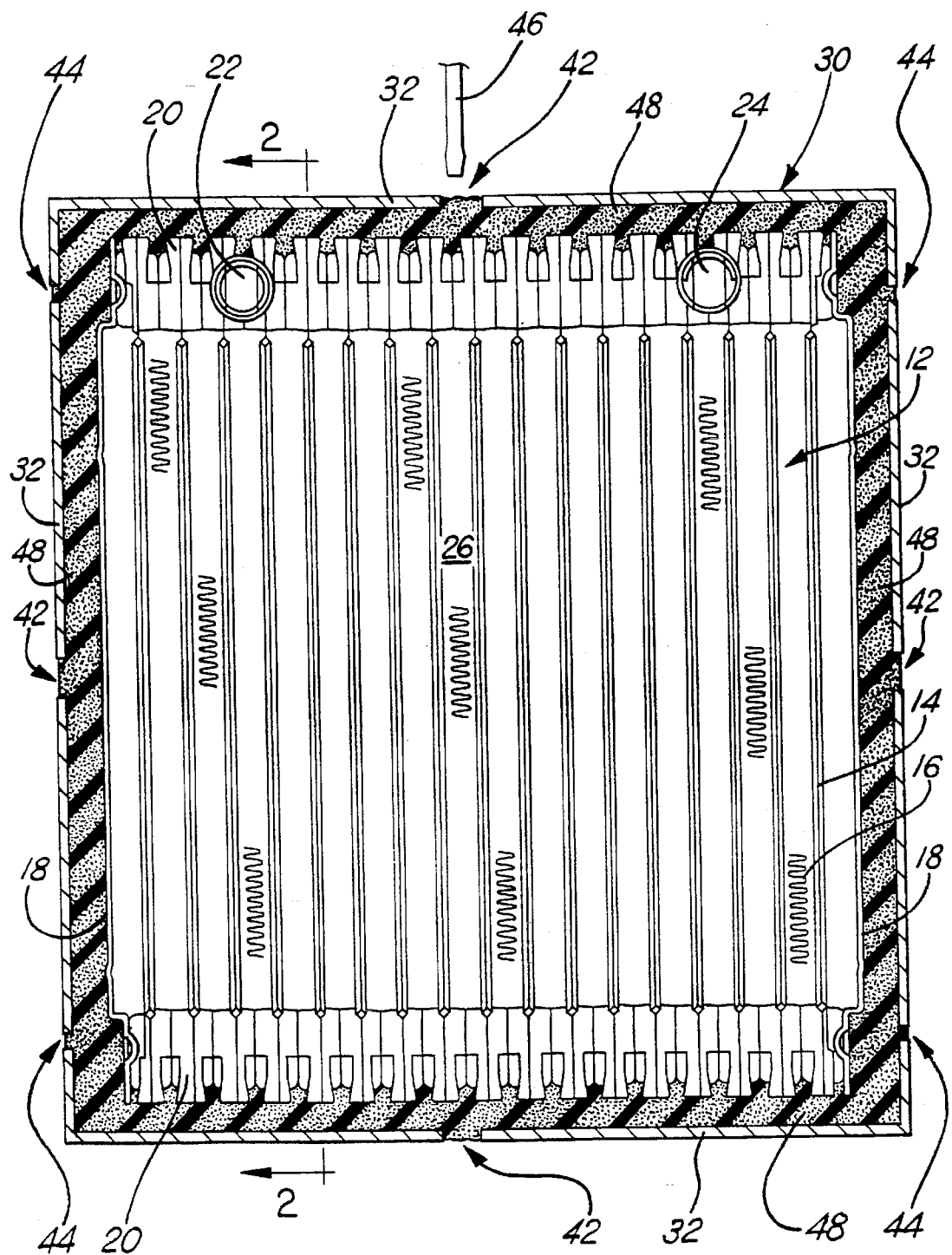
FIG. 1 is a front elevational view of a heat exchanger assembly according to the present invention, wherein the seal and the housing are shown in cross-section.
Figure 2:
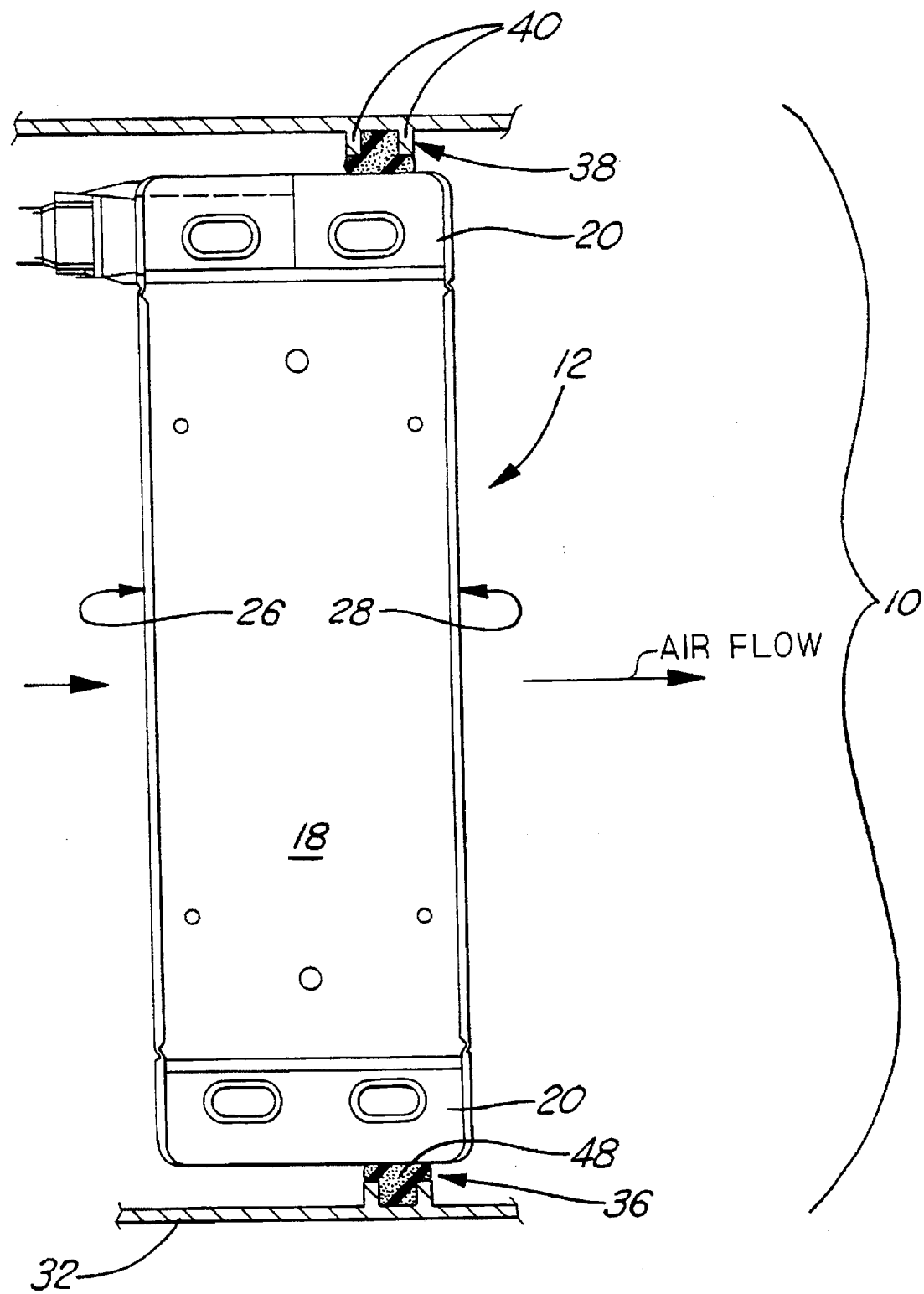
FIG. 2 is a sectional view of the heat exchanger assembly of FIG. 1, taken along line 2—2.

FIGS. 1 and 2 show a heat exchanger assembly 10 particularly suited for use in an air conditioning system of an automotive vehicle. Assembly 10 includes a heat exchanger core, such as generally rectangular evaporator core 12. Evaporator core 12 is constructed in known manner and includes a plurality of interleaved fluid conducting plates 14 and heat transfer fins 16. Endsheets 18 define two generally parallel, opposite ends of core 12. The two remaining ends of core 12 are generally perpendicular to endsheets 18 and comprise one or more fluid tanks 20. An inlet manifold 22 and an outlet manifold 24 provide for fluid flow into and out of one of the tanks 20. Evaporator core 12 further includes an air inlet face 26 and an air outlet face 28 spaced apart by the four generally orthogonal ends of core 12 described above. Air flows through inlet face 26 and outlet face 28 in the direction indicated by the arrows in FIG. 2.

Assembly 10 further includes a housing 30 for receiving evaporator core 12. Housing 30 is generally made era molded plastic, such as polypropylene, and comprises a plurality of walls 32 disposed around the ends of core 12. In a preferred embodiment of the invention, core 12 is positioned within housing 30 such that a sealing space 36 is created between each of the ends of core 12 and each of the walls 32 of housing 30. Preferably, each of the walls 32 has a channel member 38 provided on the interior surface thereof (see FIG. 2). As illustrated in FIG. 2, each channel member 38 includes a pair of leg portions 40, which extend towards core 12 and generally define the width of sealing space 36. Channel members 38 may be integrally formed with walls 32 or separately attached thereto, and are generally spaced apart from core 12 to accommodate variations in the size of the core.

Housing walls 32 are further provided with a plurality of injection ports 42 in fluid communication with channel members 38. In the illustrated embodiment of the invention, each housing wall 32 is provided with one injection port 42, positioned generally medially along the length thereof. Of course, those skilled in the art will understand that many other configurations of injection ports 42 are possible.

After core 12 is positioned within housing 30, a flowable seal precursor material is introduced into channel members 38 through injection ports 42. Channel members 38 direct the flow of the seal precursor material along the lengths of the ends of core 12 between core 12 and housing walls 32. Ideally, the spacing of channel members 38 from the ends of core 12 permits the venting of air from sealing space 36 during the injection step without allowing leakage of the precursor material therefrom. Additional vent paths are provided by vent ports 44, which are disposed at predetermined locations within walls 32 and communicate with sealing space 36. In addition to functioning as vents, vent ports 44 may also serve as view ports through which the seal precursor material is visible when the desired amount of material has been injected into sealing space 36. Generally, the injection step is continued until the seal precursor material is visible through each of the vent ports 44 provided in walls 32. The seal precursor material may be injected into each of the injection ports 42 in sequential fashion, or alternatively, two or more injection ports 42 could be supplied with the precursor material simultaneously.

Suitable seal precursor materials for use with the present invention include those materials used in conventional form-in-place applications, such as silicones, polyurethanes, plastisols and thermoplastics. Preferably, the seal precursor material is a foamable material comprising a liquid sealant mixed with a foaming agent. A preferred sealant for use with the present invention is a thermoplastic, styrenic block copolymer commercially available from Finalley Adhesives Inc. of Wauwatosa, Wis., under the product designation H5136K01. This sealant is melted and mixed with a suitable foaming agent, such as nitrogen gas, to form a preferred seal precursor material. The mixing of the sealant and the foaming agent can be accomplished with commercially available systems known to those skilled in the art, such as the "FOAMMIX" and "FOAMMELT" systems available from Nerdson Corp. of Westlake, Ohio. Such systems generally include a dispensing nozzle 46 through which the resulting seal precursor material may be injected into sealing space 36. Injection pressures of between about 50 psi and 200 psi are desirable for use with the present invention. Once injected, the seal precursor material preferably expands to fill space 36.

Depending upon the components comprising the seal precursor material, the precursor material solidifies within sealing space 36 by cooling or curing to form a seal 48 which substantially fills space 36. Preferably, seal 48 comprises a closed-cell foam capable of adhering to both core 12 and housing walls 32. As best illustrated in FIG. 1, the interior surface of seal 48 closely conforms in shape to the exterior surfaces of the ends of core 12, filling any recesses present therein, while its exterior surface closely conforms in shape to the interior surfaces of walls 32 and fills any recesses present therein. Airflow around core 12 is thereby effectively eliminated by seal 48.

From the foregoing description, one of ordinary skill in the art can easily ascertain the essential characteristics of this invention and, without departing from the spirit and scope thereof, make various changes and modifications to the invention to adapt it to various uses and conditions. For example, while the heat exchanger assembly of the present invention has been shown and described as an evaporator assembly, the invention is also applicable to other heat exchanger assemblies, such as heater assemblies in which the form-in-place seal comprises a suitable temperature resistant material.

Other modifications and variations are also within the spirit and scope of the present invention. For example, while a seal 48 is formed between each of the four ends of core 12 and each of the four walls 32 of housing 30 in the preferred embodiment described hereinabove, sealing benefits may also be achieved by forming a seal 48 between less than all of the core ends and housing walls. Generally, at least two ends of core 12 and at least two walls 32 of housing 30 will have a seal 48 formed therebetween. For assemblies in which only two ends of core 12 and two walls 32 of housing 30 have a seal 48 formed therebetween, the two ends preferably comprise fluid tanks since these have traditionally been the most difficult ends to seal. Ideally, the remaining ends of core 12 are positioned in fluid tight relationship against the remaining walls 32 of housing 30. Alternatively, preformed gaskets may be used to fill the gaps between these remaining core ends and housing walls. These and other modifications which fall within the scope of the present invention are intended to be included within the terms of the appended claims.

What is claimed is:

1. A heat exchanger assembly for an automotive vehicle, comprising:

a generally rectangular heat exchanger core defining four generally orthogonal ends;

a housing configured to receive said heat exchanger core therein, said housing having a plurality of walls disposed around the ends of said heat exchanger core, at least two of said walls and at least two of said ends cooperating to define a sealing space therebetween, each of said at least two walls having an injection port provided therein for receiving a seal precursor material into the sealing space; and a seal formed from said precursor material in the sealing space, said seal substantially filling the space.

2. The heat exchanger assembly of claim 1, wherein one of the ends of said heat exchanger core having said seal formed thereagainst comprises a fluid tank.

3. The heat exchanger assembly of claim 1, wherein two of the ends of said heat exchanger core having said seal formed thereagainst comprise fluid tanks.

4. The heat exchanger assembly of claim 1, wherein each of said at least two walls includes a channel member provided on the interior surface thereof in fluid communication with the injection port provided therein, such that said seal precursor material is received into said channel member through said injection port.

5. The heat exchanger assembly of claim 4, wherein each channel member includes two leg portions extending from said interior surface of said wall towards said heat exchanger core.

6. The heat exchanger assembly of claim 5, wherein said leg portions are spaced apart from said heat exchanger core.

7. The heat exchanger assembly of claim 1, wherein said housing includes a plurality of vent ports provided at predetermined locations in said walls, said vent ports being in fluid communication with said sealing space.

8. The heat exchanger assembly of claim 1, wherein each injection port is provided generally medially along the length of one of said walls.

9. The heat exchanger assembly of claim 1, wherein each of said walls and each of said ends cooperates to define a sealing space therebetween.

10. An evaporator assembly for an automotive vehicle, comprising:
- a generally rectangular evaporator core defining four generally orthogonal ends;
- a housing configured to receive said evaporator core therein, said housing having a plurality of walls disposed around the ends of said evaporator core, each of said walls and each of said ends cooperating to define a sealing space therebetween, said walls having a plurality of injection ports provided at predetermined locations therein for receiving a seal precursor material into the sealing space; and
- a seal formed from said precursor material in the sealing space, said seal substantially filling the space.

11. The evaporator assembly of claim 10, wherein each of said walls is provided with one of said injection ports.

12. The evaporator assembly of claim 11, wherein each injection port is located generally medially along the length of each wall.

13. The evaporator assembly of claim 10, wherein each of said walls includes a channel member provided on the interior surface thereof in fluid communication with one of said injection ports, such that said seal precursor material is received into said channel member through said injection port.

14. The evaporator assembly of claim 13, wherein each channel member includes two leg portions extending from said interior surface of said wall towards said evaporator core.

15. The evaporator assembly of claim 14, wherein said leg portions are spaced apart from said evaporator core.

16. The evaporator assembly of claim 10, wherein said housing includes a plurality of vent ports provided at predetermined locations in said walls, said vent ports being in fluid communication with said sealing space.

* * * * *